(12) United States Patent
Choi

(10) Patent No.: US 12,501,100 B2
(45) Date of Patent: Dec. 16, 2025

(54) DISPLAY DEVICE THAT OPERATES NORMALLY REGARDLESS OF AN IR SIGNAL FOR CONTROLLING OTHER DEVICES

(71) Applicant: LG ELECTRONICS INC., Seoul (KR)

(72) Inventor: Hyun Min Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 105 days.

(21) Appl. No.: 18/473,608

(22) Filed: Sep. 25, 2023

(65) Prior Publication Data

US 2024/0388760 A1    Nov. 21, 2024

(30) Foreign Application Priority Data

May 19, 2023  (KR) .......................... 10-2023-0064749

(51) Int. Cl.
*H04N 21/422* (2011.01)
*G08C 23/04* (2006.01)
*H04N 21/426* (2011.01)

(52) U.S. Cl.
CPC ....... *H04N 21/42221* (2013.01); *G08C 23/04* (2013.01); *H04N 21/426* (2013.01)

(58) Field of Classification Search
CPC ............. H04B 10/299; H04N 21/4222; H04N 21/426; G08C 23/04; H03K 5/1252
See application file for complete search history.

(56) References Cited

U.S. PATENT DOCUMENTS

| | | | | |
|---|---|---|---|---|
| 5,098,110 A | * | 3/1992 | Yang ..................... | G06F 3/0231 345/158 |
| 6,157,319 A | * | 12/2000 | Johns ............... | H04N 21/43615 341/173 |
| 8,134,649 B2 | * | 3/2012 | Rogers ............. | H04N 21/42221 348/706 |
| 8,717,148 B2 | * | 5/2014 | Kim ....................... | G08C 17/02 340/3.1 |
| 9,883,179 B2 | * | 1/2018 | Bly, Jr. ................. | H04N 17/04 |
| 11,171,764 B1 | * | 11/2021 | Bennett ..................... | H04L 5/14 |
| 11,228,797 B2 | * | 1/2022 | Kim ................. | H04N 21/42212 |

(Continued)

FOREIGN PATENT DOCUMENTS

| | | |
|---|---|---|
| JP | 05-137179 | 6/1993 |
| KR | 10-1039963 | 6/2011 |

(Continued)

OTHER PUBLICATIONS

Korean Intellectual Property Office Application No. 10-2023-0064749, Office Action dated Aug. 16, 2024, 4 pages.

*Primary Examiner* — Brian P Yenke
(74) *Attorney, Agent, or Firm* — LEE, HONG, DEGERMAN, KANG & WAIMEY

(57) ABSTRACT

Disclosed is a display device including an IR receiving module configured to receive an IR signal including at least one of a control signal, a noise signal, and a modified signal from the outside, a filter module configured to output an output signal by filtering the modified signal at each filtering period, and a controller configured to obtain a period of the noise signal and set the filtering period based on the obtained period.

12 Claims, 9 Drawing Sheets

(56) References Cited

U.S. PATENT DOCUMENTS

| | | | |
|---|---|---|---|
| 11,776,388 B1* | 10/2023 | Chaboud | H04N 21/42221 |
| | | | 348/734 |
| 11,854,382 B2* | 12/2023 | Song | H04N 21/44218 |
| 11,917,238 B2* | 2/2024 | Jung | H04N 21/43637 |
| 2005/0190073 A1* | 9/2005 | Berges | G08C 17/00 |
| | | | 398/112 |
| 2007/0292135 A1* | 12/2007 | Guo | H04B 10/299 |
| | | | 340/13.24 |
| 2008/0121782 A1* | 5/2008 | Hotelling | G01J 1/44 |
| | | | 382/209 |
| 2009/0245803 A1* | 10/2009 | Garner | H04N 21/42204 |
| | | | 398/106 |
| 2010/0119242 A1* | 5/2010 | Hayashi | H04B 17/309 |
| | | | 398/208 |
| 2014/0176808 A1* | 6/2014 | Mickelsen | H04N 21/43615 |
| | | | 348/734 |
| 2017/0256160 A1* | 9/2017 | Zhang | G08C 17/02 |
| 2018/0070125 A1* | 3/2018 | Lee | G08C 17/00 |
| 2020/0092541 A1* | 3/2020 | Hur | H04N 21/426 |
| 2020/0107065 A1* | 4/2020 | Kim | G08C 17/02 |
| 2022/0217436 A1* | 7/2022 | Lee | H04N 21/4432 |
| 2023/0012150 A1* | 1/2023 | Baek | H04N 21/42212 |
| 2024/0040076 A1* | 2/2024 | Lim | H04N 21/426 |
| 2025/0184575 A1* | 6/2025 | Choi | H04N 21/4882 |

FOREIGN PATENT DOCUMENTS

| | | |
|---|---|---|
| KR | 10-1175364 | 8/2012 |
| KR | 10-2014-0103598 | 8/2014 |
| KR | 10-2016-0012248 | 2/2016 |

\* cited by examiner

A1    A2

DISPLAY DEVICE THAT OPERATES NORMALLY REGARDLESS OF AN IR SIGNAL FOR CONTROLLING OTHER DEVICES

CROSS-REFERENCE TO RELATED APPLICATION(S)

Pursuant to 35 U.S.C. § 119 (a), this application claims the benefit of earlier filing date and right of priority to Korean Patent Application No. 10-2023-0064749, filed on May 19, 2023, the contents of which are all hereby incorporated by reference herein in their entireties.

BACKGROUND OF THE INVENTION

1. Field of the Invention

The present disclosure relates to a display device and in particular, to a display device that operates normally regardless of an IR signal for controlling other devices.

2. Discussion of the Related Art

Digital TV services using wired or wireless communication networks are becoming common. Digital TV services are capable of providing various services that could not be provided by the existing analog broadcasting services.

For example, Internet Protocol Television (IPTV) and smart TV services, which are types of digital TV services, provide interactivity so that users can actively select the types of watching programs, the watching time, and the like. The IPTV and smart TV services can provide various additional services, such as Internet search, home shopping, and online games, based on such interactivity.

The operation of a television (TV) may be controlled by a physical button on the TV or a radio signal. The radio signal may include an IR signal. However, IR signals may be generated from other devices in a place where the TV is installed. In this case, an IR signal for controlling the TV may be modified by an IR signal of another device. As a result, the TV does not operate, causing inconvenience to the user.

SUMMARY OF THE INVENTION

An object of the present disclosure is to minimize the problem of failing to control a display device when a control signal for controlling the display device is modified due to a noise signal for controlling another device.

A display device according to an embodiment of the present disclosure may include an IR receiving module configured to receive an IR signal including at least one of a control signal, a noise signal, and a modified signal from the outside, a filter module configured to output an output signal by filtering the modified signal at each filtering period, and a controller configured to obtain a period of the noise signal and set the filtering period based on the obtained period.

A display device according to an embodiment of the present disclosure, a controller may obtain a lead code included in a received IR signal, and, when the obtained lead code is identical to a lead code for controlling the display device, obtain the received IR signal as a control signal, and obtain the received IR signal as a noise signal or a modified signal when the obtained lead code is different from a lead code for controlling the display device.

A display device according to an embodiment of the present disclosure, a controller may obtain a received IR signal as the noise signal when a lead code of an IR signal received while the display device is powered off is different from a lead code for controlling the display device, and obtain the received IR signal as a modified signal when a lead code of an IR signal received while the display device is powered on is different from a lead code for controlling the display device.

A display device according to an embodiment of the present disclosure, a controller may further obtain a period of a noise signal when the IR signal is obtained as a noise signal.

A display device according to an embodiment of the present disclosure, a controller may obtain a period of a noise signal based on a time interval between times when a noise signal is received.

A display device according to an embodiment of the present disclosure, a controller may obtain a period of the noise signal based on an average time interval between times when a noise signal is received.

A display device according to an embodiment of the present disclosure, a controller may set a filtering period to be identical to a period of the noise signal.

A display device according to an embodiment of the present disclosure, a controller may set a filtering period to have a predetermined range of tolerance for a period of the noise signal.

A display device according to an embodiment of the present disclosure, a controller may obtain a period of each of a plurality of noise signals respectively generated in a plurality of other control devices, and output an output signal by filtering a modified signal for the period of each of the plurality of noise signals.

A display device according to an embodiment of the present disclosure, a controller may update a period of the noise signal when a user input for updating the period of the noise signal is obtained.

A display device according to an embodiment of the present disclosure, a control signal is a signal received from a remote control device, a noise signal is a signal received from a control device other than the remote control device, and a modified signal is a signal having a waveform of the control signal which has been modified by the noise signal.

The display device of the present disclosure learns the periodic noise signal, and when receiving the noise signal while receiving the control signal, simply removes the noise signal.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
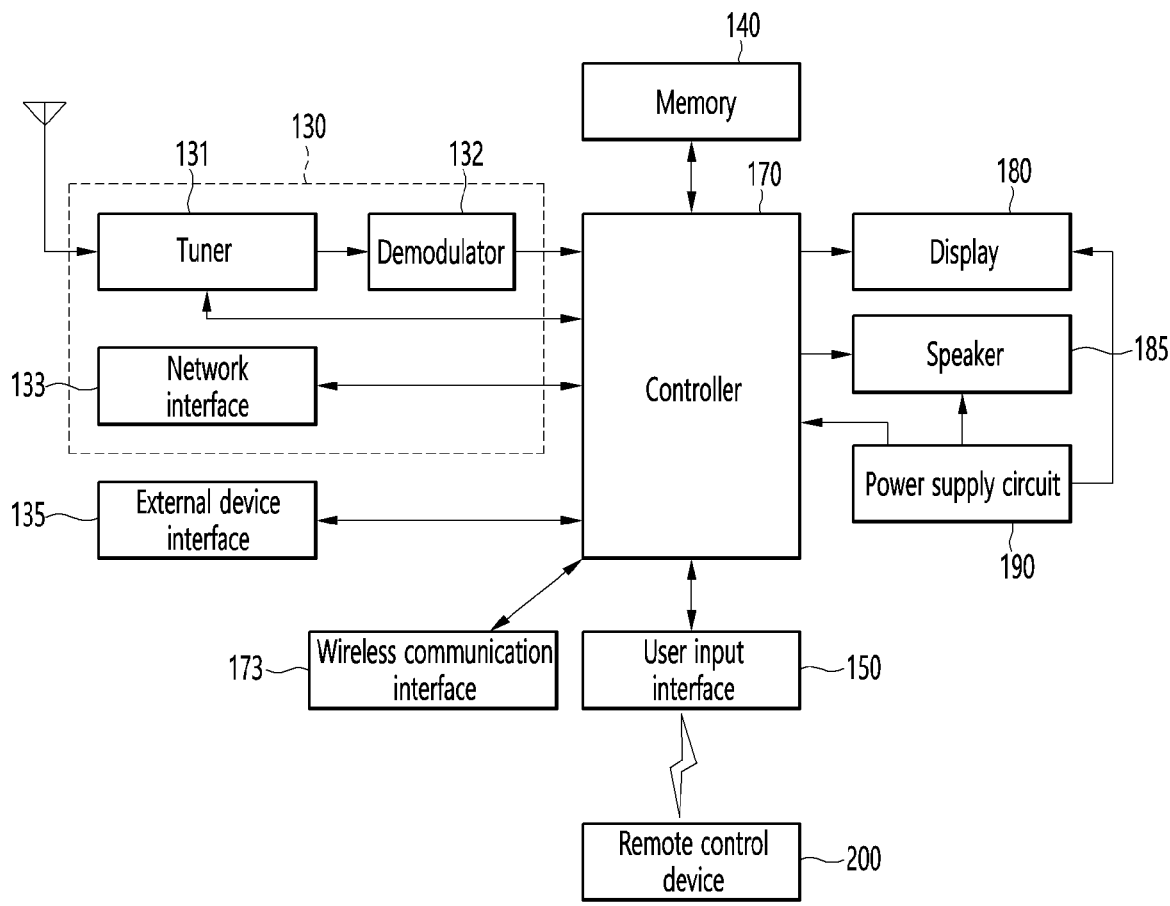
FIG. 1 is a block diagram showing a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100. In addition, the controller 170 may control the display device 100 by a user command input through the user input interface 150 or an internal program and connect to a network to download an application a list of applications or applications desired by the user to the display device 100. The controller 170 may allow the channel information or the like selected by the user to be output through the display 180 or the speaker 185 along with the processed image or audio signal. In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the audio output unit 185.

Next, a remote control device according to an embodiment of the present disclosure will be described with reference to FIGS. 2 to 3.

Figure 2:
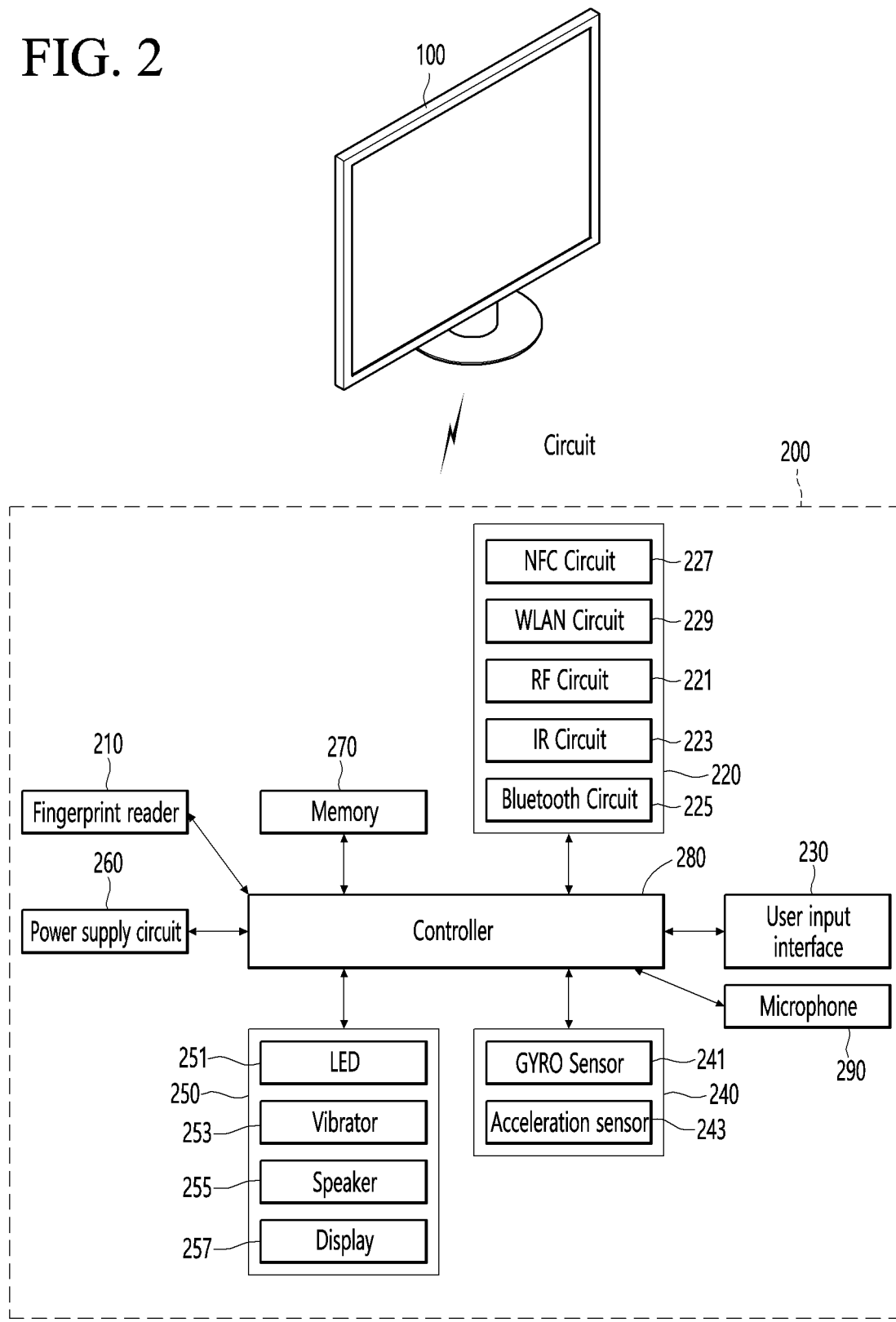
FIG. 2 is a block diagram of a remote control device according to an embodiment of the present disclosure.
Figure 3:
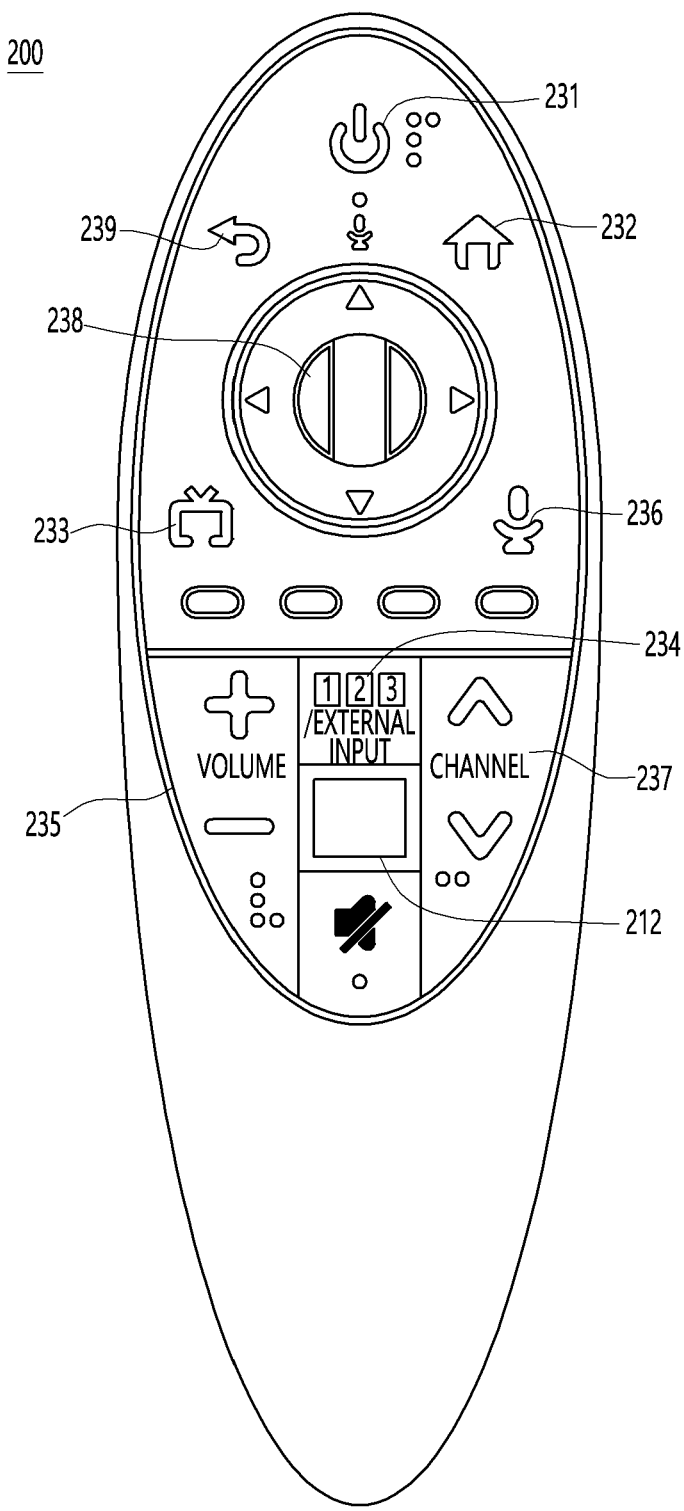
FIG. 3 shows an actual configuration example of a remote control device 200 according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290. Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 4.

Figure 4:
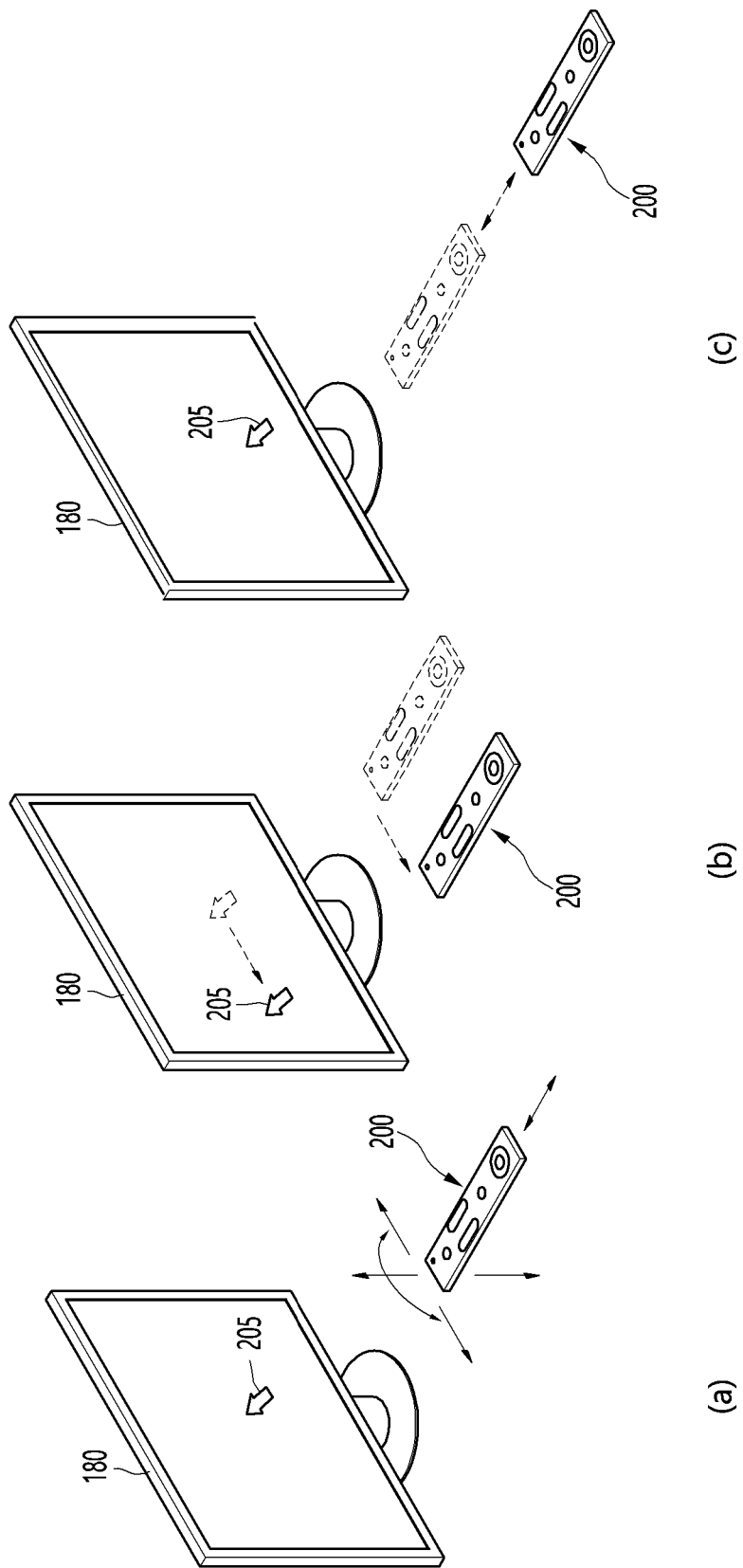
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

The display device 100 may operate based on a control signal. The control signal may be an IR signal received from the remote control device 200.

However, an IR signal other than the control signal may be generated around the display device 100. For example, a control device other than the remote control device 200 may transmit an IR signal.

The IR signal transmitted by the other control device may be a noise signal. For example, a docking guide signal transmitted from the docking station of a robot cleaner to the robot cleaner may be the noise signal.

A waveform of the control signal may be modified by a waveform of the noise signal transmitted from another control device. That is, the control signal may be overlapped or canceled by the noise signal.

When the waveform of the control signal is modified, the display device 100 may not operate or may malfunction.

Figure 5:
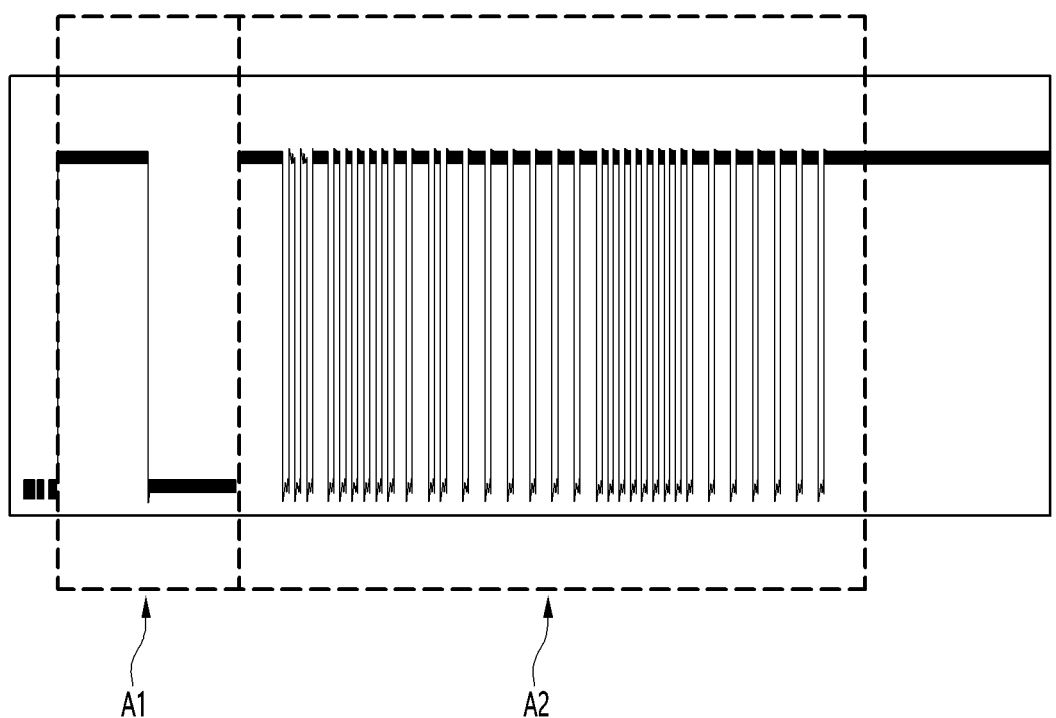
FIG. 5 is a diagram illustrating a waveform of an IR signal for controlling a display device according to an embodiment of the present disclosure.

FIG. 5 is a diagram illustrating a waveform of an IR signal for controlling a display device according to an embodiment of the present disclosure.

Figure 6:
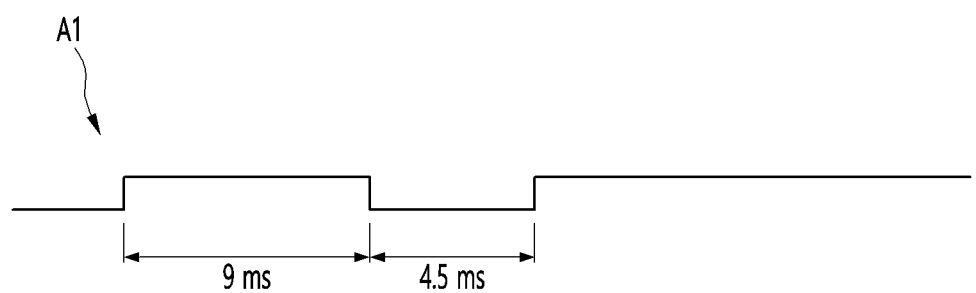
FIG. 6 is a diagram schematically illustrating a waveform of a lead code included in an IR signal for controlling a display device according to an embodiment of the present disclosure.

FIG. 6 is a diagram schematically illustrating a waveform of a lead code included in an IR signal for controlling a display device according to an embodiment of the present disclosure.

An IR signal may include at least some or all of a lead code A1 and an operation code A2. The lead code may be a code located at the beginning of the IR signal.

The control target device may determine whether or not the received IR signal is a signal for controlling the control target device based on the lead code A1.

When the control target device determines that the received IR signal is a signal for controlling the control target device, the control target device may operate based on the received IR signal.

The control target device may operate based on the IR signal only when receiving the IR signal including a unique lead code. The unique lead code may be a lead code for controlling the control target device. The unique lead code may be set differently for control target devices.

For example, a lead code for controlling the display device 100 may be a lead code having a HIGH signal of 9 ms and a LOW signal of 4.5 ms.

Accordingly, when the display device 100 receives the lead code A1 having the HIGH signal of 9 ms and the LOW signal of 4.5 ms, the display device 100 may operate based on the received IR signal.

On the other hand, when the display device 100 receives a lead code different from the HIGH signal of 9 ms and the LOW signal of 4.5 ms, the display device 100 may not operate based on the received IR signal.

To this end, the IR signal transmitted from the remote control device 200 to the display device 100 may include the lead code A1 including the HIGH signal of 9 ms and the LOW signal of 4.5 ms.

The operation code A2 may be a code positioned subsequent to the lead code A1.

The control target device may obtain which operation code the received IR signal corresponds to based on the operation code A2 included in the received control signal.

The control target device may obtain which operation is to be perform based on the waveform of the received operation code A2.

The operation code may be set differently for operations of the control target device.

For example, the display device 100 may perform a volume down operation when receiving a signal including the same waveform as the operation code A2 of FIG. 5.

Figure 7:
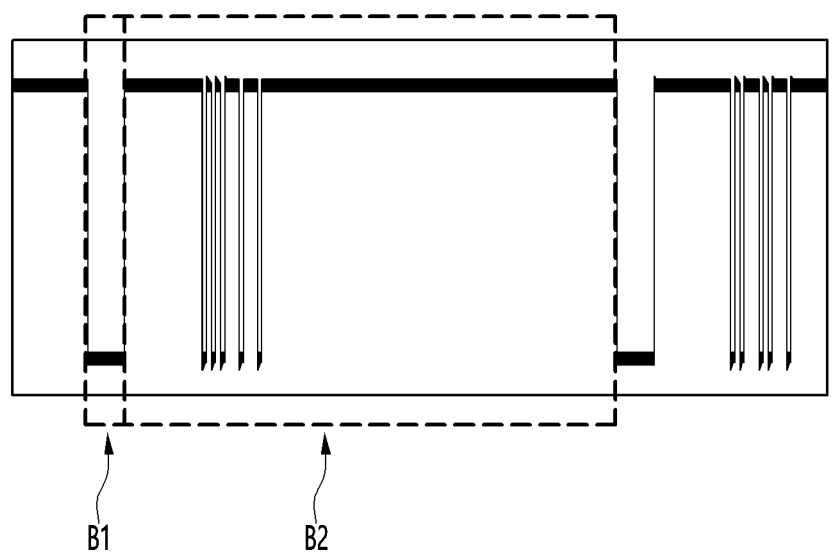
FIG. 7 is a diagram illustrating a waveform of an IR signal for controlling another device other than the display device according to the present disclosure.

FIG. 7 is a diagram illustrating a waveform of an IR signal for controlling another device other than the display device according to the present disclosure.

Figure 8:
FIG. 8 is a diagram schematically illustrating a waveform of a lead code included in an IR signal for controlling another device other than the display device according to the present disclosure.

FIG. 8 is a diagram schematically illustrating a waveform of a lead code included in an IR signal for controlling another device other than the display device according to the present disclosure.

The IR signal for controlling another device than the display device 100 may include at least some or all of the lead code B1 and the operation code B2.

Another control device 300 (see FIG. 10) other than the remote control device 200 may transmit an IR signal for controlling the another device to the another device.

For example, the another device of FIGS. 7 and 8 may be a robot cleaner (not shown). The another control device 300 (see FIG. 10) of FIGS. 7 to 8 may be a docking station (not shown). The robot cleaner (not shown) may operate based on an IR signal transmitted from the docking station (not shown).

However, the another device may include various electronic devices that operate based on an IR signal. Also, the another control device 300 (see FIG. 10) may include various electronic devices that transmit an IR signal.

Meanwhile, a lead code for controlling a robot cleaner (not shown) may be a lead code having a LOW signal of 4.5 ms.

When the robot cleaner (not shown) receives the lead code B2 having the LOW signal of 4.5 ms, the robot cleaner may operate based on the received IR signal.

To this end, the IR signal transmitted from the docking station (not shown) to the robot cleaner (not shown) may include the LOW signal of 4.5 ms.

Meanwhile, the operation code B2 of FIG. 7 may be a code for inducing docking of the robot cleaner. The docking station (not shown) may transmit a docking guide signal for inducing the robot cleaner to return and perform docking for charging to the robot cleaner (not shown).

For example, when receiving a signal including the same waveform as that of FIG. 7, the robot cleaner (not shown) may return to a docking station (not shown) and perform a docking operation.

Figure 9:
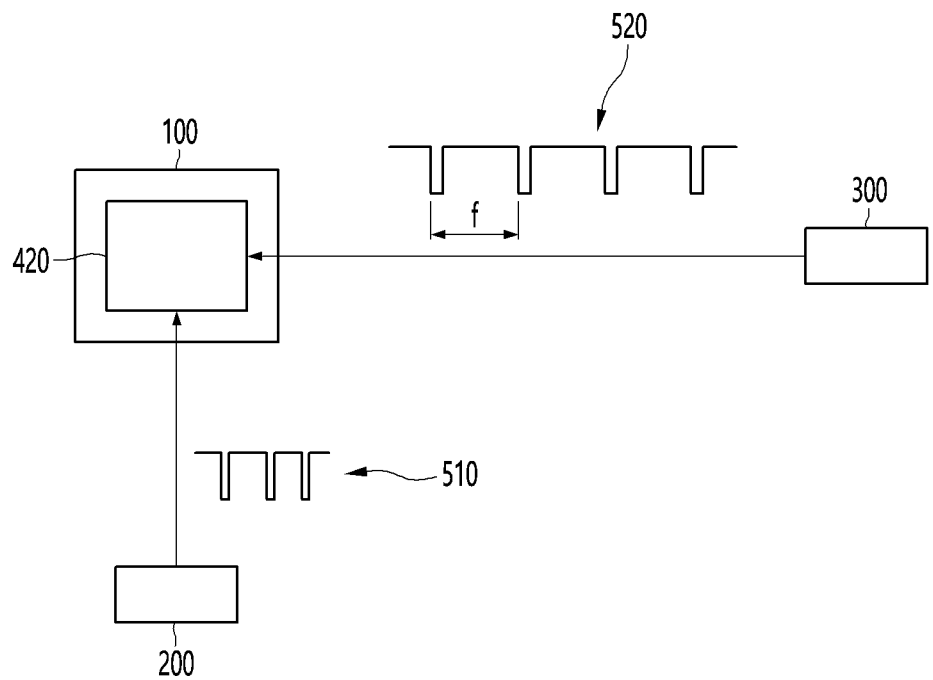
FIG. 9 is a diagram illustrating an example of a process of receiving an IR signal in a display device according to an embodiment of the present disclosure.

FIG. 9 is a diagram illustrating an example of a process of receiving an IR signal in a display device according to an embodiment of the present disclosure.

The display device 100 may receive an IR signal from the remote control device 200.

The IR signal received by the display device 100 from the remote control device 200 may be a control signal 510 for controlling the display device 100.

The display device 100 may receive an IR signal from another control device 300.

The another control device 300 may transmit an IR signal for controlling the another device 300 to the other device (not shown). When the display device 100 is located at an adjacent distance to the another control device 300, the display device 100 may receive the IR signal transmitted by the another control device 300.

The IR signal received by the display device 100 from the another control device 300 may be a noise signal 520.

The noise signal may be a periodic signal. The noise signal may be transmitted from the another control device 300 at regular periods "f". The display device 100 may receive the noise signal transmitted by the another control device 300 at regular periods "f".

When the display device 100 simultaneously receives the control signal 510 and the noise signal 520, the IR signal received by the display device 100 is a waveform obtained by transforming the control signal 510 by the noise signal 520.

Thus, the display device 100 of the present disclosure attempts to filter the IR signal having the modified waveform received by the filter module 420.

Next, it will be described in more detail with reference to FIG. 10.

Figure 10:
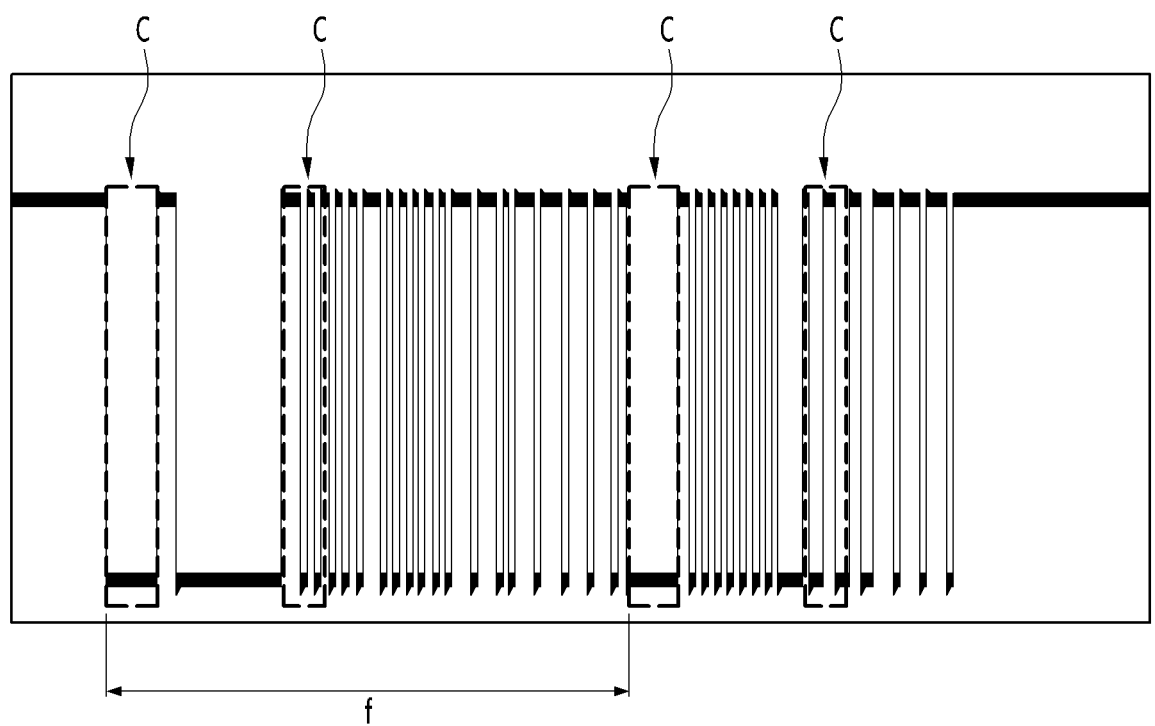
FIG. 10 is a diagram illustrating a waveform of an IR signal received by a display device according to an embodiment of the present disclosure.

FIG. 10 is a diagram illustrating a waveform of an IR signal received by a display device according to an embodiment of the present disclosure.

The waveform of the IR signal received by the display device 100 may be a waveform of a control signal which has been modified by a noise signal. The control signal may be interfered with by the noise signal. The control signal may be at least partially offset or enhanced by the noise signal.

For example, a control signal transmitted by the remote control device 200 to decrease the volume of the display device 100 may be modified by a noise signal transmitted by a docking station (not shown).

An IR signal having a waveform of the control signal which has been modified by the noise signal may be a modified signal.

The signal having the waveform of FIG. 5 may be a control signal, and the signal having the waveform of FIG. 10 may be a modified signal.

Referring to FIGS. 5 and 10, the modified signal may include a region C different from that of the control signal. Accordingly, the display device 100 may not perform any operation unlike the case of receiving a control signal.

On the other hand, the noise signal transmitted by the docking station (not shown) may be a periodic signal having a regular period (f) like a docking guide signal. When the noise signal is a periodic signal, the region C different from the control signal may be formed in the modified signal at regular periods "f".

Accordingly, an object of the present disclosure is to provide a display device 100 that stores information related to a noise signal and operates by filtering an IR signal based on the stored information.

In particular, an object of the present disclosure is to provide the display device 100 that operates by periodically filtering the noise signal when the noise signal is a periodic signal.

Next, a method of operating a display device according to an embodiment of the present disclosure will be described with reference to FIGS. 11 and 12.

Figure 11:
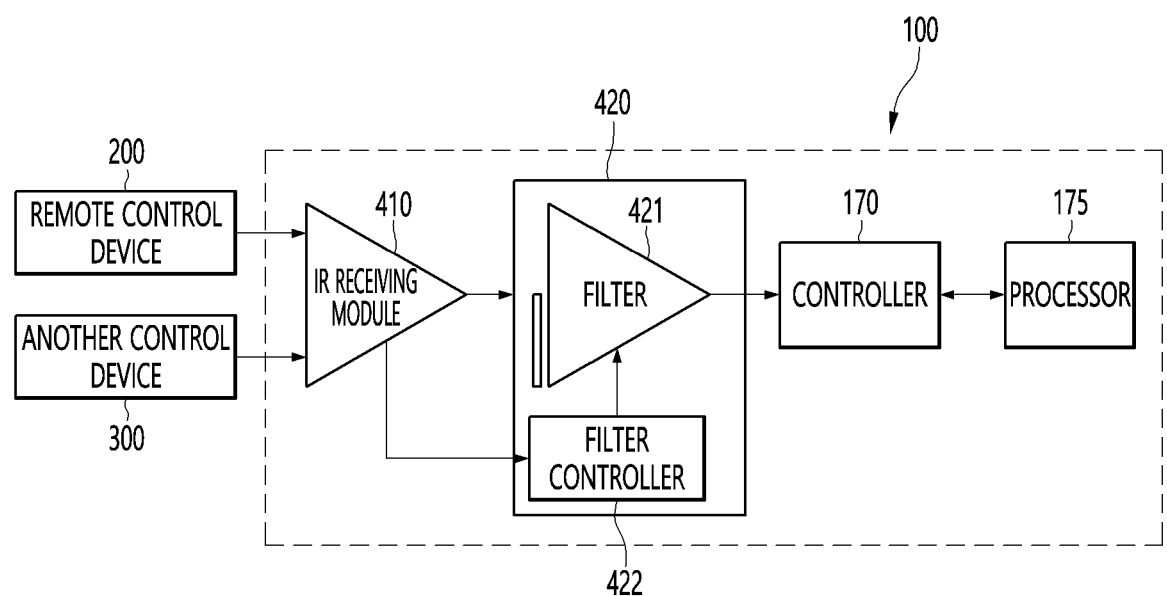
FIG. 11 is a block diagram of a display device, a remote control device, and another control device according to an embodiment of the present disclosure.

FIG. 11 is a block diagram of a display device, a remote control device, and another control device according to an embodiment of the present disclosure.

The display device 100 may receive an IR signal from at least one of a remote control device 200 and another control device 300.

The remote control device 200 may transmit a control signal to the display device 100.

The another control device 300 may transmit an IR signal for controlling another device. An IR signal received by the display device 100 from the another control device 300 may be a noise signal.

Meanwhile, when the another control device 300 transmits a noise signal while the remote control device 200 is transmitting a control signal, the IR signal received by the display device 100 may be a modified signal.

The display device 100 may include some or all of an IR receiving module 410, a filter module 420, a controller 170, and a processor 175.

The IR receiving module 410 may receive an IR signal from the outside. The IR receiving module 410 may receive at least one of a control signal, a noise signal, and a modified signal. The IR receiving module may transmit the received IR signal to the filter module 420.

The filter module 420 may include some or all of a filter 421 and a filter controller 422.

The filter 421 may filter the IR signal received from the IR receiving module 410. The filter 421 may output an output signal by filtering the received IR signal. A control signal output from the filter 421 may be transmitted to the controller 170.

The filter 421 may include a low pass filter (LPF), a high pass filter (HPF), a band pass filter (BPF), and the like, but is not limited thereto.

The filter controller 422 may set a filtering period of the filter 421. However, unlike what is shown in the drawing, the filter controller 422 may be included in the controller 170. Alternatively, the controller 170 may set the filtering period of the filter 421.

The controller 170 may control the operation of the display device 100 based on an output signal output from the filter module 420.

The controller 170 may transmit a result of operation according to the received control signal to the processor 175. The controller 170 may include a microcomputer (not shown), but is not limited thereto.

The processor 175 may allow each component of the display device 100 to operate based on the received result of operation. The processor 175 may be implemented in the form of an SoC (not shown), but is not limited thereto.

Next, a method of operating a display device according to an embodiment of the present disclosure will be described with reference to FIG. 12.

Figure 12:
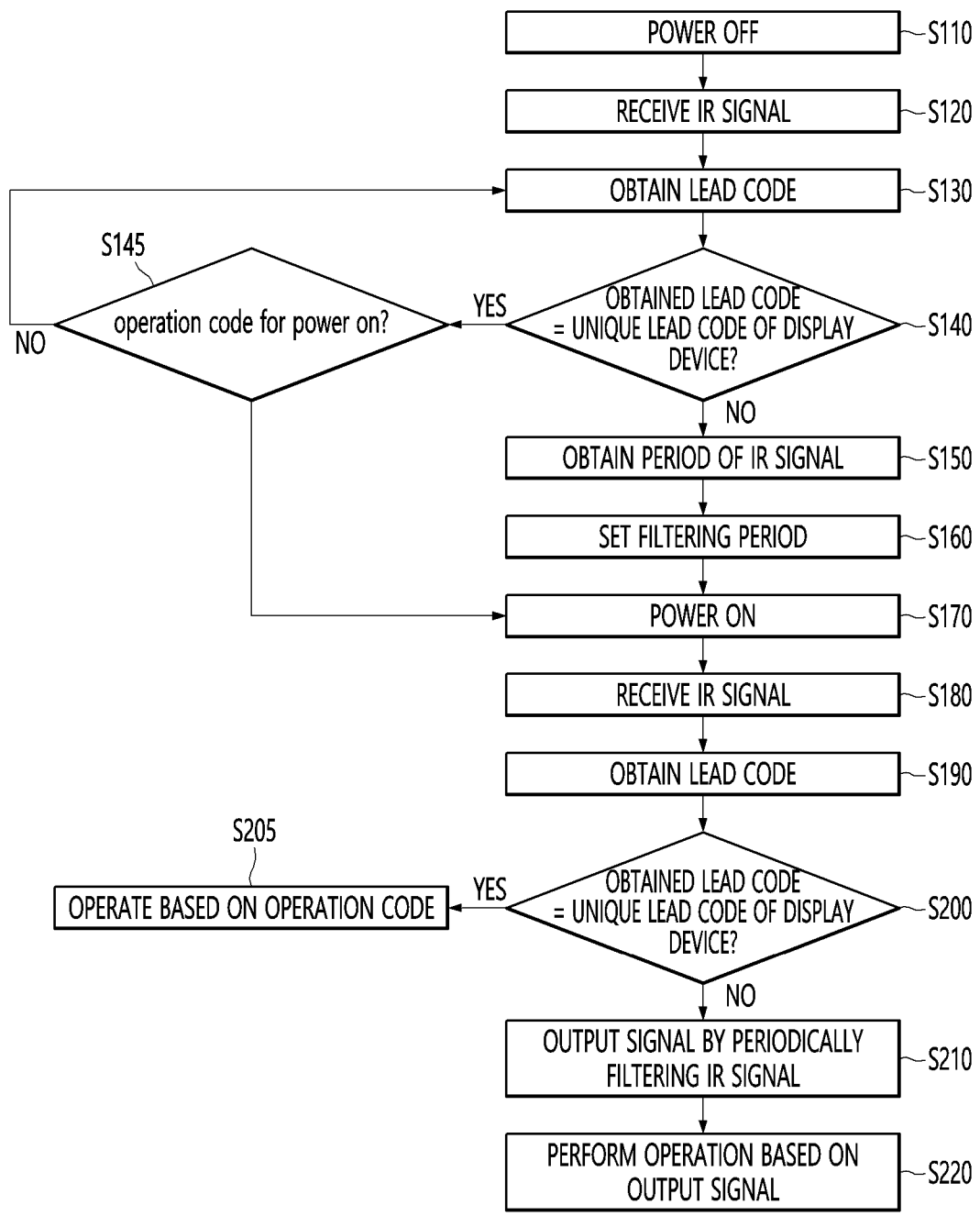
FIG. 12 is a flowchart illustrating a method of operating a display device according to an embodiment of the present disclosure.

FIG. 12 is a flowchart illustrating a method of operating a display device according to an embodiment of the present disclosure.

The display device 100 may receive an IR signal (S120) while the display device 100 is powered off (S110).

The display device 100 may receive the IR signal from at least one of the remote control device 200 and the another control device 300 while the display device 100 is powered off.

The controller 170 may receive an IR signal through the IR receiving module 410.

The controller 170 may obtain a lead code included in the received IR signal (S130). Next, the controller 170 may obtain whether the obtained lead code is identical to a unique lead code of the display device 100 (S140).

The controller 170 may obtain the IR signal as a control signal when the obtained lead code is identical to the lead code for controlling the display device 100.

When the controller 170 obtains the IR signal as a control signal, the controller 170 may further obtain an operation signal included in the control signal.

The controller 170 may obtain whether the operation code included in the control signal is an operation code for powering on the display device 100 (S145).

When the operation code included in the control signal is an operation code for powering on the display device 100, the controller 170 may power on the display device 100.

Meanwhile, when the operation code included in the control signal is different from the operation code for powering on the display device 100, the controller 170 may continuously receive the IR signal.

Accordingly, it is possible to prevent malfunction due to pressing buttons of the remote control device 200 by mistake.

Meanwhile, the controller 170 may obtain the period of the IR signal when the received lead code is different from the unique lead code of the display device 100 (S150).

The controller 170 may obtain the received IR signal as a noise signal when the received lead code is different from the lead code for controlling the display device 100. Alternatively, when the controller 170 receives a lead code different from the lead code for controlling the display device 100 multiple times within a preset time, the controller 170 may obtain the received IR signal as a noise signal. The preset time may be a time set in consideration of an average period of the noise signal.

That is, the controller 170 may obtain the period of the noise signal.

For example, the controller 170 may obtain the period of the noise signal from the time when the noise signal is first received to the time when a command to power on the display device 100 is received.

Alternatively, the controller 170 may obtain the period of the noise signal from the time when the noise signal is first received to the time when the noise signal has been received a predetermined number of times or more. The predetermined number of times may be the minimum number of times necessary for the period of the noise signal to have reliability.

The controller 170 may obtain the period of the noise signal based on an interval between times when the noise signal is received.

For example, the controller 170 may receive the noise signal a plurality of times and obtain an average of time intervals between times when the noise signal is received as the period of the noise signal.

However, the controller 170 may obtain the period of the noise signal in various ways, but is not limited thereto.

The controller 170 may set a filtering period (S160).

The filtering period may be a period at which the filter 421 filters the noise signal.

The controller 170 may set a filtering period based on the obtained period of the noise signal.

The filtering period may be set equal to the period of the noise signal.

Alternatively, the filtering period may be set to have a predetermined range of a tolerance for the period of the noise signal.

The predetermined range may be determined differently according to the performance of the filter 421 or the controller 170.

Alternatively, the predetermined range may be determined such that the output signal of the filter 421 has a tolerance less than a certain range with respect to the control signal.

The predetermined range may be a range determined such that the display device 100 is able to operate based on the output signal of the filter 421.

After the display device 100 is powered on (S170), the display device 100 may receive an IR signal (S180).

After the display device 100 is powered on, the display device 100 may receive an IR signal from at least one of the remote control device 200 and the another control device 300.

The controller 170 may receive an IR signal through the IR receiving module 410.

The controller 170 may obtain a lead code included in the received IR signal (S190). Next, the controller 170 may obtain whether the obtained lead code is identical to a unique lead code of the display device 100 (S200).

The controller 170 may obtain the IR signal as a control signal when the obtained lead code is identical to the lead code for controlling the display device 100.

When the controller 170 obtains the IR signal as a control signal, the controller 170 may further obtain an operation code included in the control signal.

The controller 170 may operate based on the operation code included in the control signal (S205).

Meanwhile, when the received lead code is different from the unique lead code of the display device 100, the controller 170 may periodically filter the received IR code (S210).

When the received lead code is different from the lead code for controlling the display device 100, the controller 170 may obtain the received IR signal as a modified signal. The modified signal may be a signal having a waveform of the control signal which has been modified by the noise signal.

The controller 170 may periodically filter the modified signal. The controller 170 may filter the modified signal at every period set in step S160.

The controller 170 may filter the modified signal at every period set through the filter 421. The filter 421 may output an output signal by filtering the modified signal at every period set in step S160. The filter 421 may transmit the output signal to the controller 170.

The output signal may have a waveform identical to the waveform of the control signal before the control signal is modified. The output signal may have a waveform similar to the waveform of the control signal before the control signal is modified, within a certain range. The output signal may have a tolerance within a range capable of controlling the operation of the display device 100 and may be similar to the control signal.

The display device 100 may perform an operation based on the output signal (S220).

The controller 170 may control the display device 100 based on the output signal received from the filter 421.

Summarizing FIG. 12, the display device 100 according to an embodiment of the present disclosure may learn a period of a noise signal and filter an IR signal based on the learned period. Accordingly, the display device 100 according to an embodiment of the present disclosure may operate as in the case of receiving an unmodified control signal by simply removing the noise signal.

In addition, the display device 100 according to another embodiment of the present disclosure may obtain a period of each of noise signals generated by a plurality of other control devices, and filter the modified signal at every period of the noise signal.

Accordingly, there is an advantage in that all noise signals transmitted by various control devices can be filtered.

Also, the display device 100 according to another embodiment of the present disclosure may update the period of the noise signal when a user input for updating the period of the noise signal is obtained.

Accordingly, when a use environment is changed, such as a new control device is provided in the place where the display device 100 is installed, there is an advantage in that a new noise signal can be immediately learned.

According to an embodiment of the present disclosure, the above-described method can be implemented with codes readable by a processor on a medium in which a program is recorded. Examples of the processor-readable medium may include read-only memory (ROM), random access memory (RAM), compact disc read-only memory (CD-ROM), magnetic tape, floppy disk, and optical data storage device.

The display device described above is not limitedly applicable to the configurations and methods of the above-described embodiments, and the embodiments are configured by selectively combining all or part of the embodiments such that various modifications can be made.

What is claimed is:

1. A display device comprising:
an IR receiving module configured to receive, from an outside, IR signals;
a controller configured to:
identify a period of noise signals, from among the received IR signals, based on a time interval between times when each of the noise signals is received, wherein the noise signals are for controlling a device that is different than the display device; and
set a filtering period based on the identified period of the noise signals; and
a filter module configured to filter a modified signal, from among the received IR signals, according to the set filtering period to provide an output signal comprising a control signal configured to control the display device.

2. The display device of claim 1, wherein the controller is configured to:
identify a lead code included in the received IR signals, and, when the identified lead code is identical to a lead code for controlling the display device, identify the received IR signals as the control signal; and
identify the received IR signals as the noise signals or the modified signal when the identified lead code is different from the lead code for controlling the display device.

3. The display device of claim 2, wherein the controller is configured to:
identify the received IR signals as the noise signals when a lead code of an IR signal received while the display device is powered off is different from the lead code for controlling the display device; and
identify the received IR signals as the modified signal when a lead code of an IR signal received while the display device is powered on is different from the lead code for controlling the display device.

4. The display device of claim 3, wherein the controller is configured to further identify the period of the noise signals when the IR signals are identified as the noise signals.

5. The display device of claim 3, wherein the controller is configured to set the filtering period to be identical to the period of the noise signals.

6. The display device of claim 1, wherein the controller is configured to identify the period of the noise signals based on an average time interval between times when each of the noise signals is received.

7. The display device of claim 6, wherein the controller is configured to set the filtering period to have a predetermined range of tolerance for the period of the noise signals.

8. The display device of claim 1, wherein the controller is configured to identify a period of each of a plurality of second noise signals respectively generated in a plurality of other control devices, and output an output signal by filtering the modified signal for the period of each of the plurality of second noise signals.

9. The display device of claim 1, wherein the controller is configured to update the period of the noise signals when a user input for updating the period of the noise signals is obtained.

10. The display device of claim 1, wherein the control signal is a signal received from a remote control device, the noise signals are received from a control device other than the remote control device, and the modified signal is a signal having a waveform of the control signal which has been modified by the noise signals.

11. The display device of claim 1, wherein the control signal of the output signal provided by the filter module includes a waveform that is within a defined range of a waveform of a control signal included in the modified signal received by the IR receiving module.

12. A display device comprising:
an IR receiver configured to receive, from an outside, IR signals comprising a modified signal, wherein the modified signal includes a noise signal and a control signal configured to control the display device;
a controller configured to:
identify a period of noise signals, from among the received IR signals, based on a time interval between times when each of the noise signals is received, and
set a filtering period based on the identified period of the noise signals; and
a filter configured to filter the received noise signal from the modified signal, according to the set filtering period, to provide an output signal having a waveform that is within a defined range of a waveform of the control signal of the received modified signal.

* * * * *